United States Patent [19]

Sobel

[11] 3,992,474
[45] Nov. 16, 1976

[54] MOTOR FUEL PRODUCTION WITH FLUID CATALYTIC CRACKING OF HIGH-BOILING ALKYLATE

[75] Inventor: Jay E. Sobel, Highland Park, Ill.
[73] Assignee: UOP Inc., Des Plaines, Ill.
[22] Filed: Dec. 15, 1975
[21] Appl. No.: 641,120

[52] U.S. Cl. .................. 260/683.48; 260/683.53; 260/683.62
[51] Int. Cl.² .................. C07C 3/54; C07C 3/56
[58] Field of Search ............... 260/683.43, 683.4 R, 260/683.48, 683.62, 683.58, 683.53

[56] References Cited
UNITED STATES PATENTS

| | | | |
|---|---|---|---|
| 2,381,256 | 8/1945 | Callaway | 260/683.62 |
| 2,762,853 | 9/1956 | Jones et al. | 260/683.43 |
| 3,045,055 | 7/1962 | Van Pool et al. | 260/683.48 |
| 3,686,354 | 8/1972 | Hervert | 260/683.48 |

Primary Examiner—George Crasanakis
Attorney, Agent, or Firm—James R. Hoatson, Jr.; Thomas K. McBride; William H. Page, II

[57] ABSTRACT

High octane number motor fuel is produced by alkylating isobutane with an olefin to produce an alkylate separable into distinct low octane and high octane fractions, charging the low octane fraction to a fluidized catalytic cracking unit to generate more olefins which can be charged to the alkylation process to produce an increased quantity of high octane number alkylate.

10 Claims, 1 Drawing Figure

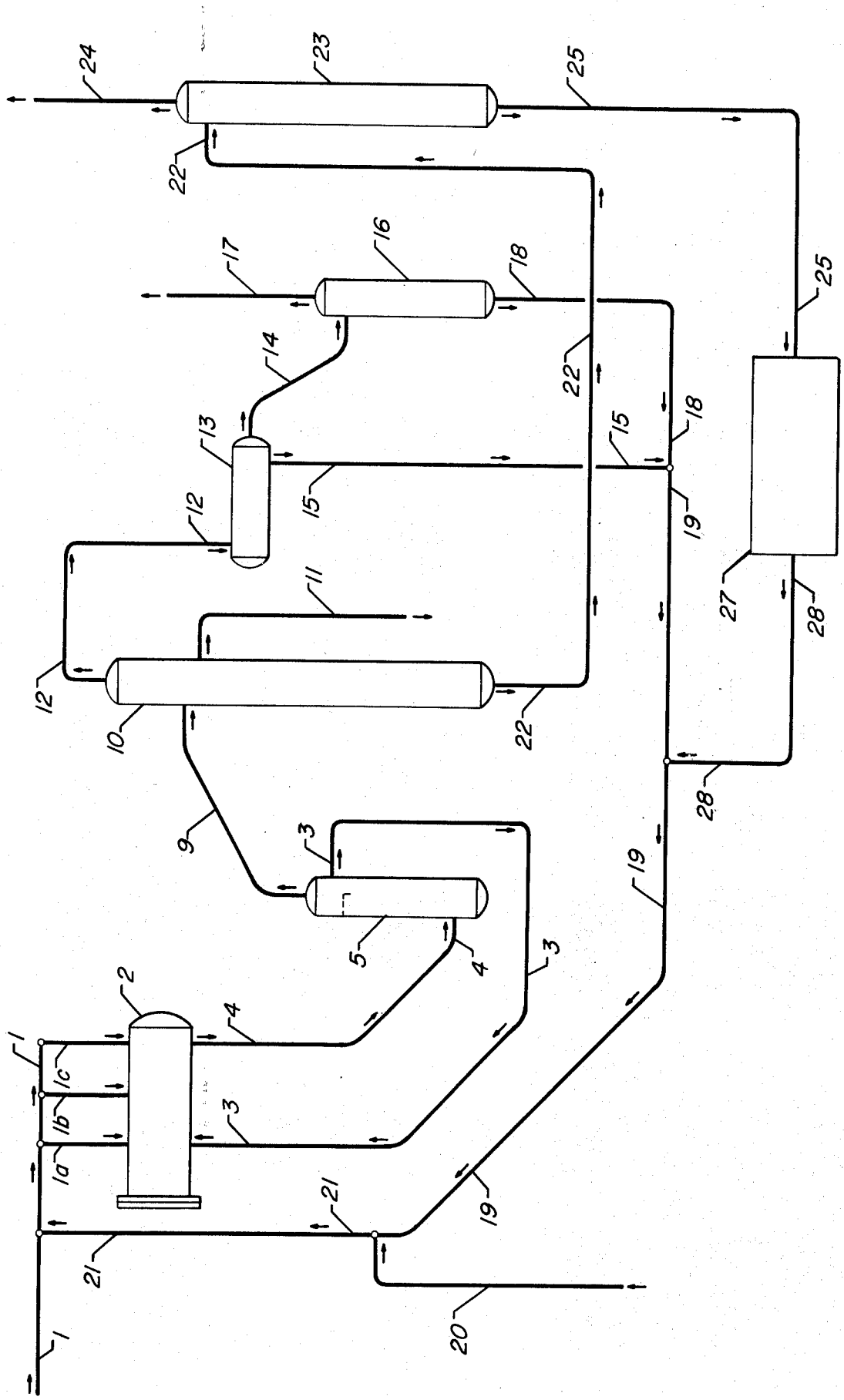

MOTOR FUEL PRODUCTION WITH FLUID CATALYTIC CRACKING OF HIGH-BOILING ALKYLATE

BACKGROUND OF THE INVENTION

1. Field of the Invention

The invention relates to the production of high octane number motor fuel via a combination of alkylation and fluidized catalytic cracking, or FCC. In particular, this invention relates to the alkylation of isobutane with a $C_3$ or $C_4$ mono-olefin to form an alkylate readily separable into a high octane and a low octane alkylate fraction. The low octane alkylate fraction is sent to an FCC unit to produce more olefins. The olefins produced are recycled to the alkylation process, resulting in an increased production of high octane number alkylate.

2. Description of the Prior Art

Production of $C_6$ to $C_{10}$ highly branched paraffins having high octane numbers is of great importance to the refinery industry. High octane number fuels are needed for high performance automotive engines and aviation engines. Higher octane fuels are needed because of the worldwide trend toward eliminating or reducing the amount of lead anti-knock additives permitted in gasoline. Refiners have for years relied on the addition of lead antiknock additives to increase product octane number to that required by modern engines. The prospect of phasing the lead out of gasoline leaves refiners with the dilemma of producing higher octane gasolines.

A common source of high octane fuel is catalytic alkylation of low boiling isoparaffins, e.g., isobutane, with mono-olefins such as propylene, butylenes, amylenes, and mixtures thereof. The typical commercial alkylation processes of today usually alkylate isobutane with butylenes and/or propylene. These commercial processes typically produce a motor fuel alkylate having a research clear octane rating of about 93 to 95.

It is well recognized in the prior art that the components present in a typical motor fuel alkylate constitute a diverse mixture of both high octane and low octane $C_5$ to $C_{10}$ isomers. The prior art also recognizes that the only portion of the alkylate product having a low octane number which can be readily separated from the total alkylate product is the high boiling portion of the alkylate, commonly referred to in the art as alkylate bottoms. In the typical alkylate produced by the catalytic alkylation of isobutane and isopentane with a typical olefin mixture of propylene, butylenes, and amylenes, the alkylate has a 50% volumetric distillation temperature at atmospheric pressure of about 90° to 115° C, and a 95% temperature of about 150° to 175° C, and infrequently as high as 200° C. The exact initial boiling point varies with the amount of light ends, e.g., butane, present in the fuel. The amount of light ends desired will vary with the seasons.

The art has recognized that a problem exists with conventional motor fuel alkylation processes. Most of this recognition has been that one fraction of the alkylate product possessed a low octane number, and in general, the solution comtemplated was either reforming of this low octane fraction or charging it to an isomerization zone.

In U.S. Pat. No. 3,502,569 (Class 208–49), the teachings of which are incorporated by reference, the patentee recognized that in a typical alkylate fraction there was a certain fraction of the alkylate which contained a relatively high dimethylhexane content. The dimethylhexanes are very low in octane and were dragging down the overall octane number of the alkylate product. The solution proposed by this patentee was to charge at least a portion of the dimethylhexane-rich fraction to a catalytic reforming zone, and ultimately blend in the reformate with the remaining, and higher octane, fraction of alkylate. Although the solution proposed in this patent would provide a significant increase in product octane, there are many refineries in which it would be impossible to practice. Thus, if a refiner had limited capacity in a catalytic reforming process, he could not tolerate the incremental charge stock from the alkylation unit effluent. Similarly, there is concern over the aromatic content of gasolines. Refiners are facing the spectre of producing a gasoline with a certain maximum of allowable aromatic content. Sending an increasing proportion of the charge stock through a catalytic reformer would increase the overall aromatic content of a refiner's gasoline pool. Thus, refiners may not have the equipment available to practice the invention in U.S. Pat. No. 3,502,569, and it is also possible that product specifications will deny refiners the option provided in that patent.

An alternative solution to this problem, i.e., of upgrading the relatively low octane number fraction of an alkylate containing a high dimethylhexane content, was disclosed in U.S. Pat. No. 3,686,354 (Class 260/683.43), the teachings of which are incorporated by reference. This reference is the closest prior art known to applicant. In this patent, the dimethylhexane fraction of the alkylate is upgraded by charging it to a disproportionation and/or transalkylation reaction zone. It is believed that the patentee was trying to convert a substantial portion of his dimethylhexane production to trimethylpentane, which has a substantially higher octane number. Unfortunately, for all catalysts known to the applicant, the equilibrium is very unfavorable for this reaction. The ratio of dimethylhexane to trimethylpentane will always be about 9 to 1. It is theoretically possible, by separation and recycle of reactants charged to the transalkylation and disproportionation zone, to increase the yield of trimethylpentane, but the expense will usually not justify such extreme methods.

Because of the deficiencies, or perhaps unrecognized problems, inherent in the prior art methods of improving the product octane number of an alkylate, I studied the work that others had done in an attempt to find a better way to improve product octane.

I discovered that there was a much more efficient way to convert the low octane number fraction of a product alkylate into something which would increase the yield of high octane, paraffinic, motor fuel. The invention is the realization that charging a relatively low octane fraction to a catalytic cracking unit results in the almost stoichiometric conversion of this low octane fraction to olefins and other light and useful materials which may be used in producing alkylate.

SUMMARY OF THE INVENTION

Accordingly, the present invention provides a process for the production of a high octane paraffinic motor fuel which comprises: (a) alkylating isobutane with a light mono-olefin by contacting the olefin and isobutane with an alkylation catalyst at alkylation conditions in an alkylation zone to produce an alkylate product containing dimethylhexanes; (b) separating said alkylate into a low boiling, high octane fraction and a high boiling, low octane fraction characterized by a dimethylhexane content substantially higher than said high octane fraction and having an initial boiling point of about 100° to 110° C; (c) contacting at least a portion of said low octane fraction with a fluidized catalytic cracking catalyst in a fluidized catalytic cracking zone to produce isobutane and olefinic hydrocarbons, and; (d) passing at least a portion of the olefinic hydrocarbons and isobutane produced in the fluidized catalytic cracking zone to the alkylation zone.

In another embodiment, the present invention also provides a process for the production of high octane paraffinic motor fuel which comprises: (a) alkylating isobutane with a mono-olefin by contacting the olefin and isobutane with an alkylation catalyst at alkylation conditions in an alkylation zone to produce an alkylate product containing at least 10 LV percent material boiling within the range of 140° to 200° C, and with an end point not exceeding 200° C; (b) separating said alkylate into a low boiling high octane fraction and a high boiling low octane fraction which contains hydrocarbons which boil within the range of 140° to 200° C; (c) contacting at least a portion of said low octane fraction with a fluidized catalytic cracking catalyst in a fluidized catalytic cracking zone at fluidized catalytic cracking reaction conditions to produce mono-olefins and isobutane; and, (d) passing at least a portion of said mono-olefins and isobutane produced in the fluidized catalytic cracking zone to the alkylation zone.

BRIEF DESCRIPTION OF THE DRAWING

The drawing is a simplified, schematic diagram of one embodiment of the present invention showing one way to combine an HF alkylation process with an FCC unit.

DETAILED DESCRIPTION

The alkylation step of the process of the present invention may comprise any alkylation process known to the art for alkylating isobutane and light mono-olefins. This alkylation is effected by contacting the olefin and isobutane with an alkylation catalyst in an alkylation zone at alkylation conditions to produce an alkylate product containing dimethylhexanes and heavier materials. Any alkylation catalyst known to the art may be used including HF, $H_2SO_4$, $AlCl_3$.

The conditions, catalyst, and methods of practicing the alkylation process are well known. No patentable novelty is claimed herein for merely alkylating isobutane and olefins.

The fluidized catalytic cracking process is also well known in the art, and an extensive discussion thereof is not believed necessary. An example of a modern FCC unit is disclosed in U.S. Pat. No. 3,785,962 (Class 208-164), the teachings of which are incorporated by reference. This patent provides for all riser cracking of fresh feed and rapid separation of cracked hydrocarbons from catalyst after riser cracking. The combination of a riser reaction zone, with rapid separation of catalyst from oil, results in a very high conversion of feed to desirable components with minimal production of coke and methane gas.

A very recent improvement in FCC operation is disclosed in U.S. Pat. No. 3,844,973 (Class 252/417), the teachings of which are incorporated by reference. This patent shows an improved catalyst regeneration process, which produces catalyst which is very hot and contains exceedingly low levels of carbon, producing a catalyst of great activity. Regenerated catalyst contains less than 0.1 wt. % coke and is supplied at a temperature exceeding 700° C. The combination of the superactive catalyst produced in this regeneration apparatus and the riser cracking process disclosed in U.S. Pat. No. 3,785,962 permits almost stoichiometric conversion of a low octane fraction to light olefins and isobutane. This is because the alkylate product fraction, especially that fraction characterized by a relatively high dimethylhexane content is very easy to crack, and has little tendency to produce coke on the catalyst.

It probably would not be economical for a refiner to provide a fluidized catalytic cracking unit just for conversion of his low octane fraction. This is not a serious limitation, because alkylation units are usually not built until after a FCC unit is built. The preferred way of practicing the present invention is to merely add the low octane fraction of alkylate product to the feed to existing FCC unit in a refinery. With the advent of very active zeolitic catalysts, and with the advent of modern regeneration techniques which produce very hot and very active catalyst, most refineries in the world today can tolerate an increase in feed to the FCC unit. It is especially desirable to add a dimethylhexane fraction to the feed to an existing FCC unit, because the presence of the heavier materials in typical feed to an FCC unit will tend to prevent the dimethylhexane, and the cracked fractions thereof, from remaining on the catalyst to form coke or methane. The heavier, more aromatic cycle oils and naphthenic materials in the charge to the FCC unit are believed to be preferentially absorbed by the zeolitic catalysts, so the presence of these refractory materials is beneficial in that it insures that dimethylhexane will be displaced from the catalyst. In a sense, the dimethylhexane can get a free ride through an existing FCC unit, in that it will see enough of the catalyst to be totally cracked, but will not contact the catalyst enough to produce a significant amount of coke.

The conditions, catalyst, and method of practicing fluidized catalytic cracking are also well known in the art, and no patentable novelty is claimed herein for any particular method of alkylation or of cracking. The inventive concept resides in the advantageous, heretofore unrecognized, method of combining these two well known refining processes to produce a high octane motor fuel.

Alternative embodiments and a more detailed description of the alkylation and cracking zones, as well as the hydrocarbons used therein, will be found in the following discussion of one preferred embodiment of the present invention, as exemplified by the drawing. In this embodiment the light olefin used is a $C_4$ mono-olefin, though any other light olefin may be used, e.g., $C_2$ to $C_5$ mono-olefins or mixtures thereof.

A $C_4$ mono-olefin feed stock, containing minor amounts of propylene and amylenes, enters the process via line 1 and is commingled with isobutane and additional olefinic material entering the process via line 21. Line 21 receives fresh makeup isobutane via line 20, and recycled isobutane from line 19, and additional isobutane and olefinic material from line 28. The feed enters reactor 2 via a plurality of inlet lines indicated as 1A, 1B, and 1C. Within reactor 2 are conventional means for temperature control of the reaction mass, and for efficient contacting of reactants with the HF catalyst which enters the reactor via line 3.

The effluent from reactor 2 is removed via line 4 and charged to mixer-settler 5. Separated HF is withdrawn via line 3 for recycle to the reaction zone. The hydrocarbon is removed from settler 5 via line 9 and charged to fractionator 10. This is a distillation column of conventional design, wherein any normal butane contained in the feed to, or produced in, alkylation reactor 2 is removed from this system as a side stream via line 11. Isobutane not consumed in the reaction zone is removed as an overhead via line 12. This stream contains entrained HF and propane produced in the reactor or carried into the reactor with feed streams. This stream is passed to condenser-receiver 13. An isobutane-rich fraction is removed via line 15 for recycle to the reaction zone via line 19. A vapor fraction is removed from separator 13 via line 14 and charged to depropanizer column 16. Propane and HF acid are removed overhead via line 17 from this vessel, while the isobutane in the feed to this vessel is recovered as a bottoms fraction via line 18 for recycle to the reaction zone.

The alkylate product is removed as a bottoms fraction from fractionator 10 via line 22 and charged to fractionator 23. Fractionator 23 separates the alkylate into a low boiling, high octane fraction having an end boiling point of about 105° C which is removed overhead via line 24. A low octane, high boiling fraction is removed as a bottoms fraction via line 25 and charged to fluidized cracking unit 27. In the preferred embodiment contemplated herein, FCC unit 27 is an existing FCC unit which is producing a significant amount of olefins and isobutane for consumption in the HF alkylation unit. To simplify the drawing, only the incremental feed to the FCC unit is shown, the dimethylhexane-rich fraction in line 25, and the only product indicated from the FCC unit is the incremental olefin and isoparaffin production, removed via line 28 and charged to reactor 2 via lines 19, 21 and 1.

ILLUSTRATIVE EMBODIMENT

The following illustrative embodiment is presented to further illustrate one preferred embodiment of the process of the present invention and should not be considered limiting. The embodiment shown has not been tested as a single, combined unit. The data presented are based upon calculations and my knowledge of HF alkylation and the FCC process.

An olefin mixture containing propylene, butylenes, and amylenes, the majority of which are butylenes, was alkylated with isobutane in a conventional commercial HF alkylation system. This HF system was maintained at alkylation conditions including a 12 to 1 isobutane to olefin mole ratio, a temperature of 30° C, a reaction zone residence time of 420 seconds, and a HF to hydrocarbon volume ratio of 1.5:1. The pressure was 13 atm, absolute. The alkylate produced, after separation of unreacted isobutane, HF catalyst, and tars, had a 89.7 calculated research clear octane number.

A sample of this motor fuel alkylate was then analyzed by fractionating it into 10 equal fractions, with each portion being analyzed for composition and octane number. The complete evaluation is presented in the following Table I.

TABLE I

OCTANE NUMBER EVALUATION AND COMPONENT ANALYSIS OF ALKYLATE FRACTION NO.

| | 1 | 2 | 3 | 4 | 5 | 6 | 7 | 8 | 9 | Botts. |
|---|---|---|---|---|---|---|---|---|---|---|
| Cut Temp. °F | — | 164.3 | 206.6 | 211.1 | 215.6 | 219.2 | 236.3 | 240.0 | 293 | 293+ |
| Volume Percent | 10 | 10 | 10 | 10 | 10 | 10 | 10 | 10 | 10 | 10 |
| Alkylate Component (Type) Weight Percent: | | | | | | | | | | |
| i-Butane | 0.3 | — | — | — | — | — | — | — | — | — |
| n-Butane | 57.5 | 2.2 | 0.1 | — | — | — | — | — | — | — |
| i-Pentane | 37.4 | 1.6 | 0.1 | — | — | — | — | — | — | — |
| n-Pentane | 2.0 | 1.5 | — | — | — | — | — | — | — | — |
| $C_3 \div C_5$ | 2.8 | — | — | — | — | — | — | — | — | — |
| 2,3-dimethylbutane | — | 28.8 | 0.7 | — | — | — | — | — | — | — |
| 2-methylpentane | — | 13.6 | 0.3 | 0.1 | — | — | — | — | — | — |
| 3-methylpentane | — | 4.2 | 0.2 | — | — | — | — | — | — | — |
| n-Hexane | — | 0.2 | — | — | — | — | — | — | — | — |
| 2,2-dimethylpentane | — | 0.1 | — | — | — | — | — | — | — | — |
| 2,4-dimethylpentane | — | 19.8 | 17.6 | 3.4 | 0.8 | — | — | — | — | — |
| 2,2,3-trimethylpentane | — | 1.3 | 0.4 | — | — | — | — | — | — | — |
| 3-methylhexane | — | 1.6 | 1.7 | 0.6 | 0.3 | — | — | — | — | — |
| 2,3-dimethylpentane | — | 22.8 | 24.5 | 9.4 | 3.9 | 1.1 | — | — | — | — |
| 3-methylhexane | — | 1.2 | 1.1 | 0.5 | 0.2 | — | — | — | — | — |
| 2,2,4-trimethylpentane | — | 1.1 | 53.3 | 86.0 | 91.4 | 56.9 | 18.7 | 2.9 | — | — |
| 2,5-dimethylhexane | — | — | — | — | 1.7 | 14.0 | 14.9 | 7.8 | 1.6 | — |
| 2,4-dimethylhexane | — | — | — | — | 1.7 | 16.7 | 18.4 | 10.6 | 2.4 | — |
| 2,2,3-trimethylpentane | — | — | — | — | — | 2.2 | 2.8 | 2.2 | 0.5 | — |
| 2,3,4-trimethylpentane | — | — | — | — | — | 6.2 | 25.5 | 31.3 | 18.0 | — |
| 2,2,3-trimethylpentane | — | — | — | — | — | 1.8 | 13.9 | 27.9 | 22.4 | — |
| 2,2-dimethylhexane | — | — | — | — | — | 1.1 | 5.8 | 14.6 | 15.9 | — |
| $C_9+$ | — | — | — | — | — | — | — | 2.7 | 39.2 | 100 |
| Total | 100.0 | 100.0 | 100.0 | 100.0 | 100.0 | 100.0 | 100.0 | 100.0 | 100.0 | 100.0 |
| Calculated Research Clear Octane No., 10% Fraction | 93.4 | 88.6 | 93.2 | 98.0 | 97.9 | 88.0 | 87.1 | 90.7 | 85.6 | 74.1 |

From the table, it is apparent that the first five 10 LV % cuts do not contain much dimethylhexane. The octane number of the first five cuts is about 10 numbers higher than that of the last five cuts.

The above-described alkylate is then fractionated to produce a high octane, low boiling fraction which represents about 50 LV % of the total alkylate and has an end boiling point of about 102° C. The calculated octane number of this fraction is about 94.2. The heavy fraction obtained has an initial boiling point of about 102° C, and a calculated octane number of about 85. This fraction is charged to an FCC unit which operates with a conventional zeolitic catalyst in an all riser cracking zone, substantially as hereinbefore described. Because of the existing capacity of the FCC unit at this refinery, it is anticipated that the charge will be merely mixed with the feed to the FCC unit. The estimated yield of material is shown in Table II.

TABLE II

Incremental FCC Yield From Low Octane Feedstock

| | Feed LV % | Product LV % |
|---|---|---|
| Coke | — | 2 |
| $H_2$ | — | — |
| $C_1$ | — | 2 |
| $C_2$ | — | 2 |
| $C_3$ | — | 2 |
| $iC_4$ | — | 35 |
| $nC_4$ | — | 9 |
| $=C_2$ | — | 2 |
| $=C_3$ | — | 4 |
| $=iC_4$ | — | 11 |
| $=nC_4$ | — | 33 |
| $C_5+$ | 100 | — |

The olefinic and isoparaffinic components, which are suitable for use in the HF alkylation process, are charged to the HF alkylation zone of the present invention. The increased yield which would be expected from these components is indicated in Table III. The product distribution required some outside isobutane to alkylate all of the olefins generated in the FCC unit.

TABLE III

INCREMENTAL YIELD FROM HF ALKYLATION

| | Product LV % |
|---|---|
| $C_4$ | 10 |
| $C_5$ | 2 |
| $C_6$ | 2 |
| $C_7$ | 5 |
| $C_8$ | 77 |
| $C_9+$ | 4 |

This alkylate is calculated to have a significantly higher octane number than the feed to the FCC unit. Because the FCC unit is such an efficient generator of olefins, additional isobutane may be charged to the HF alkylation unit, thereby increasing the yield of gasoline. Thus, the practice of the present invention will permit a refiner with excess capacity in his HF alkylation and FCC units, and with a source of isobutane, to increase both the yield and octane number of his motor fuel alkylate.

In an alternative embodiment, wherein the economics of the particular situation justify it, it may be desirable to charge only the very heaviest fraction of the alkylate to the FCC unit. Thus, if a refiner can tolerate a slightly lower octane product, he can minimize the incremental charge to the FCC zone, and also minimize the recycle of material to the HF alkylation zone by charging only the heaviest 10% of the alkylate product to the FCC zone. As this heaviest fraction is the very worst material, from an octane standpoint, it would be possible by charging this heaviest fraction zone to an FCC unit, to achieve a product octane fairly close to that afforded by recycle of one-half of the HF alkylate product. Thus, the HF alkylation product has a calculated octane number of 89.7. With recycle of all material boiling over 102° C, the product octane number will be about 94.2. If only the final 10% of the alkylate is recycled via an FCC unit, the product octane will be about 91.4. Thus, an increase of about 1.7 octane numbers can be obtained with minimal product loss (less than about 1%, yield loss to coke in the FCC unit, even excluding increased yield due to increased olefin production in the FCC unit) and with only minimal increase in charger rate to the HF alkylation unit (about 10%). Thus, for a refiner with only a slight increase in alkylation unit capacity available, and with only a slight amount of capacity for incremental charge to an FCC unit, recycle of the last 10%, LV %, of the alkylate product is indicated.

I claim as my invention:

1. A process for the production of a high octane paraffinic motor fuel which comprises:
    a. alkylating isobutane with a high mono-olefin by contacting the olefin and isobutane with an alkylation catalyst at alkylation conditions in an alkylation zone to produce an alkylate product containing dimethylhexanes;
    b. separating said alkylate into a low-boiling, high octane fraction and a high-boiling, low octane fraction characterized by a dimethylhexane content substantially higher than said high octane fraction and having an initial boiling point of about 100° to 110° C;
    c. contacting at least a portion of said low octane fraction with a fluidized catalytic cracking catalyst in a fluidized catalytic cracking zone to produce isobutane and olefinic hydrocarbons, and;
    d. passing at least a portion of the olefinic hydrocarbons and isobutane produced in the fluidized catalytic cracking zone to the alkylation zone.

2. The process of claim 1 wherein said low octane fraction comprises 30 to 60 LV % of the alkylate product.

3. The process of claim 1 wherein said low octane fraction has an initial boiling point of 102° to 105° C.

4. The process of claim 1 wherein the fluidized catalytic cracking zone provides for riser cracking of feed with catalyst containing less than 0.1 weight percent coke.

5. The process of claim 1 wherein the alkylation zone uses as a catalyst therein HF acid.

6. The process of claim 1 wherein the light mono-olefin is selected from the group of $C_2$ to $C_5$ mono-olefins and mixtures thereof.

7. A process for the production of high octane paraffinic motor fuel which comprises:
    a. alkylating isobutane with a mono-olefin by contacting the olefin and isobutane with an alkylation catalyst at alkylation conditions in an alkylation zone to produce an alkylate product containing at least 10 LV percent material boiling within the range of 140° to 200° C, and with an end point not exceeding 200° C;
    b. separating said alkylate into a low-boiling high octane fraction and a high-boiling low octane fraction which contains hydrocarbons which boil within the range of 140° to 200° C;
    c. contacting at least a portion of said low octane fraction with a fluidized catalytic cracking catalyst in a fluidized catalytic cracking zone at fluidized catalytic cracking reaction conditions to produce mono-olefins and isobutane; and,
    d. passing at least a portion of said mono-olefins and isobutane produced in the fluidized catalytic cracking zone to the alkylation zone.

8. The process of claim 7 wherein the low octane, high-boiling fraction comprises about 10 LV % of the alkylate product.

9. The process of claim 1 wherein the alkylation zone uses as a catalyst therein HF acid.

10. The process of claim 7 wherein the light mono-olefin is selected from the group of $C_2$ to $C_5$ mono-olefins.

* * * * *